Aug. 4, 1970   J. F. GRAMS ET AL   3,522,888

FOLDING TOOL TRAY

Filed May 3, 1968

INVENTOR
JOHN F. GRAMS
JAMES D. R. HARRIS

United States Patent Office 3,522,888
Patented Aug. 4, 1970

3,522,888
FOLDING TOOL TRAY
John F. Grams and James D. R. Harris, Norridge, Ill.
(both of 312 Cypress Drive, Prospect Heights, Ill. 60070)
Filed May 3, 1968, Ser. No. 726,320
Int. Cl. A47f 5/13
U.S. Cl. 211—132    3 Claims

ABSTRACT OF THE DISCLOSURE

This invention consists of three U-shaped tubular frames, one of which has four casters secured to the underside thereof as a means of horizontal support when the folding tool tray is opened to a usable position. A second U-shaped tubular frame is swingably secured to the frame that has the casters secured thereto. The second frame is provided with two parallel members to which is adjustably secured the parallel members of a third U-shaped and inverted tubular frame that has the rear end of a rectangular tray swingably secured thereto. The tray is provided with an electric light on the outer portion thereof. A brace on each side of the first and second mentioned U-shaped tubular frames locks the second mentioned frame into an upright position when this invention is ready for use. A tray supporting member is suitably secured to one side of the aforesaid tray and the cross-member of the third and inverted U-shaped tubular frame, and a like tray supporting member is likewise secured to the other side of the tray and the aforesaid supporting member.

---

This invention relates to trays; more particularly, to trays that can be folded up against their supporting members when not in actual use; still more particularly, to trays made especially for use in automobile repair shops or in machine shops.

It is the principal object of this invention to provide a folding tool tray that can be wheeled into position over the top of the engine of an automobile when a mechanic has to work on the engine, thereby providing a surface as near to the engine as possible for the mechanic to have his necessary tools and replacement parts thereon.

Another object of this invention is to provide a folding tool tray that can, as the name implies, be folded up when not in use.

Still another object of this invention is to provide a folding tool tray of the character described that has a U-shaped supporting member adapted to straddle obstructions near the place of work.

Further objects and advantages of this invention will become apparent from reading the following detailed description taken in connection with the accompanying drawing, in which.

Like reference numbers refer to like parts throughout the several views of the drawing.

Figure 1:
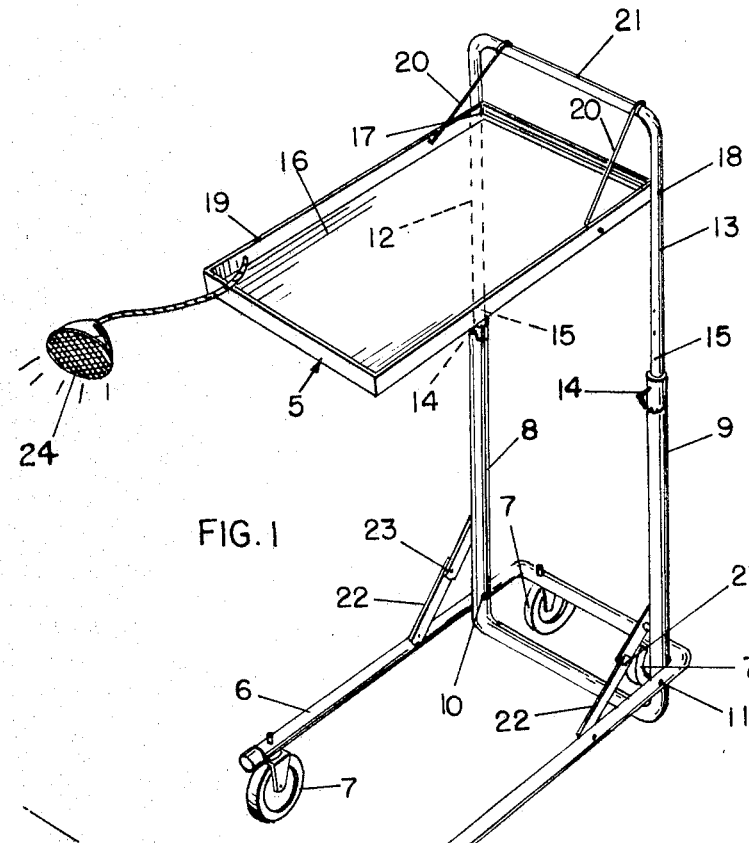
FIG. 1 is a perspective view of this invention.

The reference number 5 indicates this novel folding tool tray in its entirety.

The folding tool tray consists of a U-shaped tubular frame 6 having four supporting casters 7 secured in parallel spaced relation to the underside thereof. A second U-shaped tubular frame has parallel members 8 and 9 that become the fixed uprights when the tray is in the open or usable position, shown in FIGS. 1 and 2 of the accompanying drawing. The aforesaid second U-shaped tubular member is swingably secured at 10 and 11 to the parallel tubular members of the first mentioned U-shaped tubular frame 6. A third and inverted U-shaped tubular frame has its parallel members 12 and 13 slidably inserted in the aforesaid members 8 and 9, as one can best see by again looking at FIGS. 1 and 2 of the drawing. The upper ends of the aforesaid tubular members 8 and 9 are each provided with an opening therethrough in which is placed a removable pin 14 that also passes through one of the plurality of spaced openings 15 that are located in each of the aforesaid tubular members 12 and 13, thereby providing a means of adjustably securing the height of the aforesaid third U-shaped tubular frame that has the rear end of the tray 16 swingably secured thereto at 17 and 18 by any desired means.

The aforesaid tray 16 is preferably rectangular in shape and is provided with an upturned peripheral edge 19 that prevents any tools or parts placed thereon from falling off the tray when this invention is in actual use. Two supporting members 20 are secured to the upturned peripheral edge 19 on each side of the aforesaid tray 16 and the cross-member 21 of the aforesaid third U-shaped tubular frame, as one can see by looking at the accompanying drawing. The purpose of the two supporting members 20 is to prevent the aforesaid tray 16 from dropping down below its open horizontal position. The members 20 can be made of small steel bars that are round in cross section and have hooked ends, as will be understood by those experienced in the art of making folding trays and the like.

Returning now to the aforesaid second mentioned U-shaped tubular frame, it will be seen on again looking at FIG. 1 of the accompanying drawing that this part of the invention is locked into its vertical position by means of two braces 22, there being one brace on each side of the invention. Each brace is made up of two bars that are secured together, end to end at 23. Each brace has one end swingably secured to one of the parallel members of the aforesaid U-shaped tubular frame 6. The other end of one of the aforesaid braces 22 is secured to the parallel member 8 and the other end of the other brace is likewise secured to the parallel member 9. The two braces 22 will obviously be folded when the entire invention is folded to the position shown in FIG. 3 of the drawing.

An electric light 24 is flexibly secured to one side of the outer end of the aforesaid tray 16 in order that the mechanic can direct a beam of light directly down (or up) on that part of whatever he may be working on without the usual interference of the connecting electric cord.

Figures 2, 3:
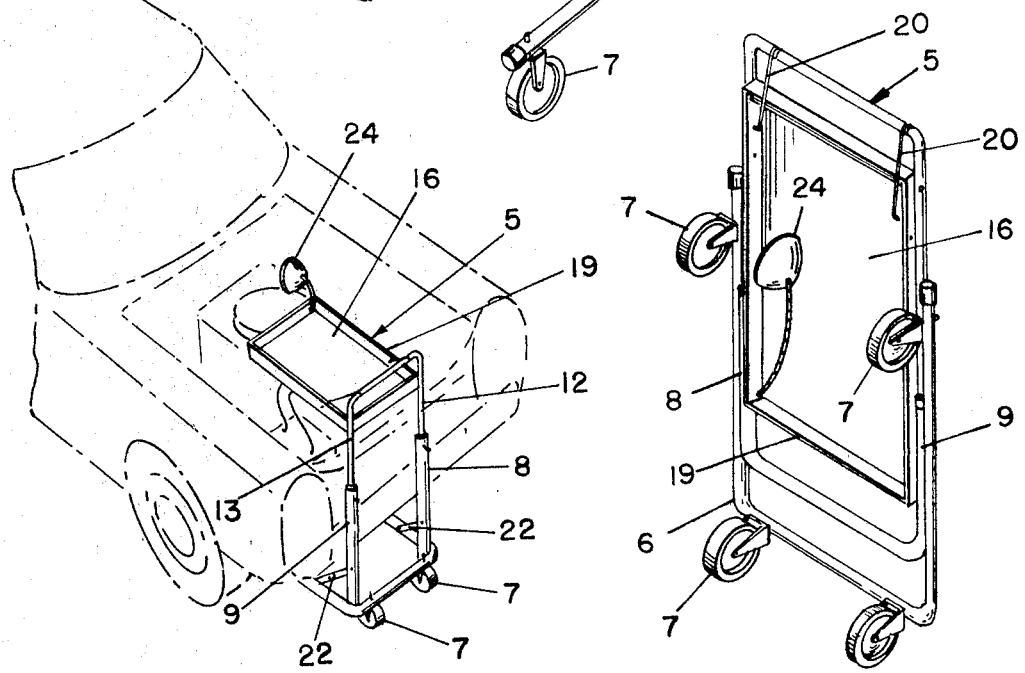
FIG. 2 is a perspective view of this invention, in place and ready for use over the top of the engine of an automobile. The automobile is shown in phantom lines.
FIG. 3 is a perspective view of this invention in its folded position.

A typical application of this invention to everyday automobile repair work is fully illustrated by examination of FIG. 2 of the accompanying drawing. However, it is to be understood that this invention is not to be limited to this particular use. The folding tray 5 can also be used by aircraft mechanics as well as by people working in a machine shop or in fact in any industry where it is desired to have a mobile vertically adjustable tray. The entire invention will preferably be made of steel for use in the automotive and/or mechanical arts. However, the entire device can be manufactured of any desired material and in any desired size and having the aforesaid tray 16 of any desired configuration. The aforesaid electric light 24 may be provided with a self-contained electric battery or it may have an extension cord that can be plugged into any desired source of electricity. The electric cord is not shown in any of the views of the accompanying drawing for reasons of clarity.

Any other desired changes may be made in this invention in so long as the change or changes fall within the scope and intent of the appended claims.

What we now claim as new and desire to secure by Letters Patent is:

1. A folding tool tray of the character described, comprising three U-shaped tubular frames each made up of two parallel members and a cross-member, a plurality of spaced and parallel casters secured to one side of one of said tubular frames thereby providing a support for this frame when the said tool tray is open and ready for use, a second of said tubular frames having its parallel members swingably secured to the parallel members of the first mentioned tubular frame at a point near the cross member of the second mentioned tubular frame, means connecting the first and second tubular frames for keeping the second mentioned tubular frame in a vertical position when the tool tray is unfolded and ready for use, a third tubular frame telescoping with the second tubular frame, means for adjustably securing these telescoping frames in any adjusted position with respect to each other, a tray swingably secured to the parallel members of the third tubular frame at points near the cross member of the third tubular frame, and means connecting the tray and third tubular frame for keeping the tray in a horizontal position when the folding tool tray is unfolded and ready for use.

2. The invention of claim 1 wherein an electric light is secured to the tray by means of a flexible member.

3. The invention of claim 1, wherein the said means connecting the tray and third tubular frame for holding the tray in a horizontal position when the said folding tray is in an open position comprises two braces, one of which is located on each side of the said tray, the upper end of each brace being secured to the cross member of that one of the said U-shaped tubular frames that has the rear end of the said tray swingably secured thereto.

References Cited

UNITED STATES PATENTS

| | | | |
|---|---|---|---|
| 2,429,034 | 10/1947 | Smith | 211—149 X |
| 2,720,402 | 10/1955 | De Puy | 211—132 X |
| 2,762,669 | 9/1956 | Watson | 211—133 X |
| 2,992,833 | 7/1961 | Hoedinghus | 211—149 X |
| 3,074,734 | 1/1963 | Munson | 211—132 X |
| 3,168,329 | 2/1965 | Goldschmidt | 211—178 X |

NILE C. BYERS, JR., Primary Examiner